(12) United States Patent
Russbuldt et al.

(10) Patent No.: US 8,988,766 B2
(45) Date of Patent: Mar. 24, 2015

(54) OPTICAL RESONATOR WITH DIRECT GEOMETRIC ACCESS TO THE OPTICAL AXIS

(75) Inventors: Peter Russbuldt, Aachen (DE); Johannes Weitenberg, Aachen (DE); Joachim Pupeza, Munich (DE); Thomas Udem, Munich (DE)

(73) Assignees: Fraunhofer-Gelleschaft zur Foerderung der angewandten Forschung e.V., Munich (DE); Max-Planck-Gesellschaft zur Foerderung der Wissenschaften e.V., Munich (DE); RWTH Aachen, Aachen (DE)

( * ) Notice: Subject to any disclaimer, the term of this patent is extended or adjusted under 35 U.S.C. 154(b) by 0 days.

(21) Appl. No.: 13/978,882

(22) PCT Filed: Dec. 21, 2011

(86) PCT No.: PCT/EP2011/006493
§ 371 (c)(1),
(2), (4) Date: Sep. 18, 2013

(87) PCT Pub. No.: WO2012/095150
PCT Pub. Date: Jul. 19, 2012

(65) Prior Publication Data
US 2014/0002892 A1    Jan. 2, 2014

(30) Foreign Application Priority Data
Jan. 10, 2011  (DE) .................. 10 2011 008 225

(51) Int. Cl.
*G02F 1/37*     (2006.01)
*G02B 17/00*   (2006.01)
(Continued)

(52) U.S. Cl.
CPC ...... *G02B 17/004* (2013.01); *G02F 2001/3542* (2013.01); *H01S 3/0092* (2013.01); *H01S 3/08068* (2013.01); *H01S 3/0816* (2013.01)
USPC ........................................................ 359/328

(58) Field of Classification Search
CPC ...................................................... H01S 3/0805
USPC .................................................. 359/326–332
See application file for complete search history.

(56) References Cited

U.S. PATENT DOCUMENTS 4,682,339 A * 7/1987 Sziklas et al. .................... 372/95
4,942,588 A * 7/1990 Yasui et al. .................... 372/103
(Continued)

OTHER PUBLICATIONS

International Search Report mailed Mar. 29, 2012 in corresponding application No. PCT/EP2011/006493.
(Continued)

*Primary Examiner* — Daniel Petkovsek
(74) *Attorney, Agent, or Firm* — Renner Kenner Greive Bobak Taylor & Weber

(57) ABSTRACT

The present invention relates to a stable optical cavity, in which an obstacle is formed or arranged on the optical axis in the form of a through-opening in one of the mirrors or of an input- or output-coupling element, in order to enable a direct geometric access to the optical axis. The mirrors of the cavity are arranged such that a degeneracy of a plurality of transverse eigenmodes of the cavity occurs without an obstacle, by the combination of which an intensity minimum is obtained in the cavity with an obstacle at the position of the through-opening or of the input- or output-coupling element. With this configuration an optical cavity of high finesse which has a position of maximum intensity on the optical axis can be realized.

10 Claims, 6 Drawing Sheets

(51) Int. Cl.
  *H01S 3/00* (2006.01)
  *G02F 1/35* (2006.01)
  *H01S 3/08* (2006.01)
  *H01S 3/081* (2006.01)

(56) References Cited

U.S. PATENT DOCUMENTS 5,079,444 A * 1/1992 Kallenbach et al. .......... 359/328
8,384,990 B2 * 2/2013 Vodopyanov et al. ........ 359/330

OTHER PUBLICATIONS

Written Opinion mailed Jul. 10, 2013 in corresponding application No. PCT/EP2011/006493.
Gordeyev et al.; *The Possibility of Using a Cavity With a Pierced Mirror in Argon Ion Lasers*; Radio Engineering and Electronic Physics; vol. 14, No. 9; Apr. 1, 1969; pp. 1420-1421.
Huang et al.; *Maximization of FEL gain for a hole-coupled resonator*; Nuclear Instruments & Methods in Physic Research—Section A: Accelerators, Spectrometers, Detectors, and Associated Equipment; Elsevier, BV; North Holland, NL; vol. 358, No. 1-3; Apr. 11, 1995; pp. 315-318.
Ming Xie; *Hole-Coupled resonators for broadly tunable infrared free electron lasers*; Proceedings of SPIE; vol. 1868, Jan. 1, 1868, Jan. 1, 1993; pp. 150-162.
Moll et al; *Output coupling methods for cavity-based high-harmonic generation*; Optics Express; vol. 14, No. 18; Jan. 1, 2006; pp. 8189-8197.
Ozawa et al.; *Non-collinear high harmonic generation: a promising outcoupling method for cavity-assisted XUV generation*; Optics Express; vol. 16, No. 9; Apr. 28, 2008; pp. 6233-6239.
Putnam et al.; *High-intensity Bessel-Gauss Beam Enhanced Cavities*; CLEO/QELS Conference; 2010.

\* cited by examiner

OPTICAL RESONATOR WITH DIRECT GEOMETRIC ACCESS TO THE OPTICAL AXIS

TECHNICAL FIELD OF APPLICATION

The present invention relates to an optical cavity composed of multiple mirrors, which has at least one obstacle in the beam path in the form of a through-opening in one of the mirrors or an input coupling or output coupling element.

Such optical cavities can be used, for example, as enhancement cavities to generate high harmonics that are coupled out from the cavity via the through-opening or the output coupling element. The direct geometric access to the optical axis enables the use of such a cavity also for other applications, such as Thomson backscattering at electrons to produce coherent X-ray radiation, pump/probe experiments or the detection of vacuum polarisation.

Passive optical cavities serve a variety of purposes. The multiple circulation of the radiation due to the cavity losses leads to an increased sensitivity to interference, which can be used for measurement applications, and to an increased intensity, the increased interaction of which can be used, for example, for non-linear processes such as frequency multiplication or processes with small cross-sections, such as Thomson backscattering at electrons. For many applications access to the axis of the cavity is necessary, in order to couple radiation into or out of the cavity. In many cases this is possible, for example, using dichroic mirrors, without incurring large losses for the circulating radiation. For some applications a geometric access to the axis of the cavity is desirable, for example, if light is to be incoupled or outcoupled at wavelengths for which no dichroic mirrors exist. Such a geometric access to the axis is represented by an aperture for the circulating radiation, which therefore has an impact on the field distribution and, in general, imparts losses which limit the enhancement of the cavity-internal power. By means of a suitable cavity design however, the losses for the circulating radiation can be kept very small, and large enhancements can therefore be obtained.

PRIOR ART

In the following, the specific problem of the output coupling of high harmonics from an fs enhancement cavity is discussed in detail. The geometric access to the optical axis of the cavity described can, of course, also be used for many other tasks however.

By focusing of fs-pulses with sufficient intensity into a gas, high harmonics of the fundamental radiation with wavelengths as small as a few nm can be generated. This spatially and temporally coherent radiation is, for example, of interest for ultra-precise spectroscopy in this wavelength range, for the generation and investigation of nanostructures, or in attosecond physics. The efficiency of the conversion, at $10^{-11}$–$10^{-6}$, is very low. In order to achieve the required intensity for the conversion at higher repetition rates in the MHz range, such as are particularly important for spectroscopy, enhancement resonators are used, in which the intensity is enhanced by factors of a few hundred or more. The achievable power enhancement P depends on the power losses per cavity round trip R according to $$P = \frac{1 - R_{IC}}{\left(1 - \sqrt{RR_{IC}}\right)^2},$$

where $R_{IC}$ is the reflectivity of the input coupling mirror. In the following the term power enhancement, or simply enhancement for short, should always be understood to mean the circulating power in relation to the incident power. The dispersion in the cavity must vanish for the entire wavelength range of the fs-radiation, in order to couple in the full spectrum. The high harmonics generated at the focus of the cavity must therefore be coupled out without incurring large losses to the fundamental or introducing dispersion. To allow scalability up to larger mean powers and peak pulse powers, the output coupling must not introduce non-linearities or thermal effects. Certain field distributions of the circulating radiation are advantageous for the production of high harmonics. Ultimately, the objective is to achieve as simple and robust a design as possible.

A well-known approach consists in the output coupling of the high harmonics through a hole or slot in the mirror behind the focus. The smaller divergence angle of the high harmonics due to the smaller wavelength makes this approach possible.

For a circulating Gaussian beam, a hole on the optical axis in the mirror must be very small in order to allow a large enhancement. The hole with Radius a represents an obstacle for the Gaussian beam with beam radius $w_f$, at which T=exp $(-2a^2/w_f^2)$ of the power is transmitted. The overlap of the clipped field with the original is once again T, so that the power losses per round trip are $1-T^2$ and the maximum achievable enhancement in the cavity is $P=1/(1-T^2)$. In order to allow an enhancement of P=100 (P=1000), the size of the hole radius may therefore only be a=0.05 $w_f$ (a=0.016 $w_f$). To estimate what fraction of the power of the high harmonics is transmitted through this hole, it should be assumed that the harmonics (h) as well as the fundamental (f) can be described as Gaussian beams whose focal radii, due to the intensity dependence of the conversion process $I_h \sim I_f^{a_h}$, are smaller by the factor $\sqrt{a_h}$. The ratio of the far field divergence angles $\theta$ and hence of the beam radii w at the location of the mirror with a hole is then, with $\theta w_0 = \lambda/\pi$, given by $$\frac{\theta_h}{\theta_f} = \frac{w_h}{w_f} = \frac{\lambda_h / \pi w_{0,h}}{\lambda_f / \pi w_{0,f}} = \frac{\sqrt{a_h}}{n},$$

where n designates the order of the harmonic. $a_h$ is dependent on the gas and the order of the harmonic, e.g. ~8. The fraction of the transmitted power is $T_h = 1-\exp(-2a^2/w_h^2)$. For a measured value $\theta_f/\theta_h = 6$ for n=9 $T_h = 0.16$ ($T_h = 0.02$) for a hole radius which allows P=100 (P=1000). For higher harmonics, which have a smaller divergence angle, the efficiency of the output coupling increases.

In order to obtain small losses, three different approaches have so far been demonstrated. The first involves exciting a higher transverse mode with a zero of the electric field on the axis in the cavity. In the second approach an imaging cavity is constructed, which reproduces the hole in the field distribution during each round trip. The third approach consists of building two cavities which are superimposed at the focus at a small angle, and generating the high harmonics in a non-collinear manner and coupling them out through a narrow gap between the focussing mirrors of the two cavities.

The first possibility has two significant drawbacks. Also, the losses at the hole in the mirror are relatively large here.

The transmission through a slotted obstacle on the optical axis with width 2a for a beam of the transverse Gauss-Hermite mode $GH_{1,0}$ with beam radius w is $$T = \text{erfc}\left(\sqrt{2}\frac{a}{w}\right) + \sqrt{\frac{2}{\pi}} 2\frac{a}{w}\exp\left(-2\frac{a^2}{w^2}\right).$$

In order to allow an enhancement of P=100 (P=1000), the width may be 2a=0.13·2w (2a=0.06·2w). The field distribution with a simple zero of the field on the optical axis is unfavourable for generating high harmonics, since the lobes (radiation lobes) of the electric field which oscillate in antiphase for a symmetrical structure of the gas target would mean that the intensity of the high harmonics on the axis thus generated also disappears. In K. D. Moll, R. J. Reynolds Jones, J. Ye, "Output coupling methods for cavity-based highharmonic generation," Opt. Expr. 14 (2006), an enhancement cavity is described in which phase masks on the focussing mirrors of the ring cavity set the two lobes of the $GH_{10}$ mode in phase, so that at the focus, the intensity on the axis is a maximum. Gauss-Laguerre modes with azimuthal mode number l>0 have a hole on the axis, for which the field strength increases with $r^l$ and thus allows larger aperture radii with smaller losses. This dependence is valid in the case that the intensity or the phase oscillates about the optical axis in accordance with the azimuthal order. In both cases, however, the resulting field distribution of the high harmonics is unfavourable.

In the simplest case an imaging cavity can be realized by a linear symmetrical-confocal cavity, for which the length is equal to the radius of curvature of the mirrors. An imaging cavity is in this case to be understood as a telecentrically imaging cavity with magnification ±1, for which the beam transfer matrix is the positive or negative identity matrix. Such a cavity can also be embodied as a ring cavity, such as is used for generating high harmonics. For this purpose, two different but equal length cavity arms can be used, or a field distribution is excited which in the forward direction represents a collimated ring about the axis and in the reverse direction forms a small focus with a maximum on the axis. W. P. Putnam, G. Abram, E. L. Falcao-Filho, J. R. Birge, F. X. Kaertner, "High-intensity Bessel-Gauss beam enhancement cavities," CLEO conference paper (2010), describe such a cavity for the cw case. In transferring the scheme to fs-radiation, the problem arises that for the confocal arrangement the cavity length is specified by the radius of curvature of the mirrors. The repetition rate of the input-coupled fs-radiation must then be adjustable. For repetition rates which require larger cavity lengths, the beam radius on the curved mirrors for a given focal length becomes unfeasibly large, and therefore susceptible to disturbanced. Aberrations are kept small in this approach due to the fact that the mirrors have reflective coatings only on a narrow ring around the hole.

The possibility of non-collinear generation of high harmonics by superposition of two beams at an angle at the focus is described in A. Ozawa, A. Vernaleken, W. Schneider, I. Gotlibovych, Th. Udem, T. W. Haensch, "Non-collinear high harmonic generation: a promising output coupling method for cavity-assisted XUV generation," Opt. Expr. 16, 6233-6239 (2008). This principle can be extended to the case of two intersecting enhancement cavities, in which case not one mirror with a hole must be used, but both the focussing mirrors of the cavities can be pushed together leaving a small gap. The system is complex, because two enhancement cavities must be controlled and matched to one another at the same time, thus affecting both the synchronization of the circulating pulses as well as the geometric alignment. The width of the gap for output coupling is limited by the losses for the fundamental radiation, which intersect at the focus at a—as small as possible—non-collinear angle, for forming an interference pattern with few stripes, on which the divergence angle of the high harmonics depends. It is expected that the high harmonics can be outcoupled with an efficiency of >20%.

A geometric output coupling has the crucial advantage that it is scalable with respect to mean power and peak pulse power, since no non-linearities or dispersion are introduced for the fundamental radiation. For wavelengths smaller than several ten nm, no other approach has been demonstrated to date.

The object of the present invention is to specify an optical cavity which allows a direct geometrical access to the optical axis for the input coupling or output coupling of radiation, has an intensity maximum on the optical axis, and can be implemented in a simple way.

DESCRIPTION OF THE INVENTION

The object is achieved with the optical cavity in accordance with claim 1. Advantageous configurations of the cavity are the subject of the dependent claims or can be inferred from the following description together with the exemplary embodiments.

The proposed optical cavity consists of multiple mirrors, by means of which the optical axis of the cavity is defined. At least one through-opening is arranged in the cavity in one of the mirrors or at least one input coupling or output coupling element is arranged on the optical axis, respectively in the beam path, which form an obstacle to the circulating radiation. Thereby, the mirrors are selected and arranged such that the cavity is stable, i.e. that the Gouy phase $\psi \mod(\pi)$ takes on values of $0<\psi<\pi$, and which without the obstacle has first eigenmodes which belong to a group of eigenmodes with the same resonant frequency, wherein at least three of these groups exist in the cavity with different resonant frequencies and new eigenmodes are produced by the obstacle by combination of the first eigenmodes of a resonance frequency which have an intensity minimum at the location of the obstacle. The mirrors are therefore arranged such that in the cavity without an obstacle, a degeneracy of some (not all) transverse eigenmodes occurs. In a stable optical cavity in the above sense, only Gauss-Hermite or Gauss-Laguerre modes of the optical radiation circulating in the cavity are reproduced for one q-parameter. The q-parameter here represents the complex beam parameter $q=z+i\cdot z_R$, where z designates the distance to the beam waist and $z_R$ the Rayleigh length. On the optical axis a through-opening is formed in at least one of the mirrors or an input- or output-coupling element is arranged which can be impermeable to the circulating radiation. The dimensions of this through-opening or output coupling element respectively are of course chosen such that the circulation of the optical radiation in the cavity is indeed affected, but not prevented. In at least one dimension therefore, the through-opening, or the input- or output-coupling element, have dimensions which are less than the beam radius of the circulating radiation at this point. Via the through-opening or the input- or output-coupling element a direct geometric access to the optical axis of the cavity is obtained, via which radiation can be coupled in or out. A direct geometric access is to be understood in particular as meaning a beam path which does not require passage through a dispersive or absorbent optical media. The proposed optical cavity is characterized in that the mirrors are arranged in such a way that a degeneracy of multiple transverse eigenmodes of the cavity without an obstacle occurs, and due to the combination of which at the position of the through-opening or the input- or output-coupling element in the cavity with an obstacle, an intensity minimum is achieved. This setting of the cavity minimizes the losses for the circulating radiation caused by the through-opening or the input- or output-coupling element, thus enabling an optical cavity with high finesse and therefore large enhancement factors. In the proposed optical cavity therefore the degeneracy of higher transverse cavity modes is exploited in order to minimize the losses. For this purpose, for example, in a ring cavity with two focussing mirrors, only the distance between the focussing mirrors needs to be appropriately adjusted. The optical cavity therefore has a simple structure and in the case of the ring resonator, offers design freedom in terms of the cavity length and the diameter of the focus.

In order to distinguish the proposed optical cavity, in which a degeneracy of some (not all) of the transverse cavity modes occurs, from an imaging cavity, it is designated hereafter as a quasi-imaging cavity. The differences between imaging and quasi-imaging within the context of the present patent application is explained in more detail in the following.

Imaging is present when all geometric-optical beams emanating from a point in the object plane meet at a point in the image plane, regardless of their angle with respect to the optical axis. For a beam transfer matrix $$M = \begin{bmatrix} A & B \\ C & D \end{bmatrix},$$

which describes the optical system, this means that the B-term vanishes. The A-term then indicates the magnification of the imaging.

The imaging process can also be understood in the mode viewpoint. Any given transverse field distribution may be expanded in accordance with the full orthonormal system of the Gauss-Hermite modes. The Gauss-Hermite modes have the property that their form does not change during propagation. Because these modes accumulate a different longitudinal phase $\phi_{n,m}$ during propagation, a change occurs in the appearance of the composite field distribution because the modes are added together with different relative phases at various locations along the propagation direction. The longitudinal phase which a mode accumulates during propagation over the path $\Delta z$ is $\phi_{n,m}=k\cdot\Delta z+(1/2+n)\cdot\psi_x+(1/2+m)\cdot\psi_y$, where n, m are the mode order and $\psi_x$, $\psi_y$ the Gouy phase in the x- and y-directions. The Gouy phase thus indicates which phase the Gauss-Hermite modes accumulate in addition to a plane wave, and for the transverse directions is given in each case by $$\tan(\psi) = \frac{z_R \Delta z}{z_R^2 + z^2 + z\Delta z}$$

with the complex beam parameter $q=z+i\cdot z_R$. In this equation z is the distance to the beam waist and $z_R$ the Rayleigh length.

Imaging is present precisely when the Gouy phase $\psi$ mod $(2\pi)=0$, since then all modes in the image plane are again added together with the same relative phase, and the field distribution of the object plane is therefore reproduced, with magnification and other divergence if present. If the Gouy phase $\psi$ mod$(2\pi)=\pi$, an inverting imaging is present, i.e. one with negative magnification, since then all the odd modes have a negative sign. The Gouy phase that is accumulated in an optical system depends on the input beam parameter and the optical system, described by the beam transfer matrix. The relation $$\tan(\psi) = \frac{z_R B}{(z_R^2 + z^2)A + zB}$$

applies. For the case B=0 therefore, $\psi$=0 or $\pi$ independently of the beam parameter.

For special values of the Gouy phase $$\psi = 2\pi \frac{p}{\Delta n},$$

p, $\Delta n \in N$, all modes with mode number $n=n_0+l\cdot\Delta n$, $n_0$, $l\in N$ are in phase, so that a field distribution composed only of these modes is reproduced. This is the case which we call quasi-imaging. Quasi-imaging is characterized by the mode number difference $\Delta n$, with $\Delta n\geq 3$. The cases $\Delta n=1$ and $\Delta n=2$ result in an imaging with magnification $\pm 1$. While in an imaging optical system the Gouy phase is 0 or $\pi$ for any given q-parameter, there is no optical system which for any arbitrary q-parameter would impress a Gouy phase of $$\psi = \frac{2\pi}{\Delta n}$$

with $\Delta n=3, 4, 5 \ldots$. But in a stable optical cavity the eigen-q parameter is characterized by the fact that it reproduces itself on each round trip. The Gouy phase per cavity round trip is $\cos(\psi)=m:=(A+D)/2$ with the terms of the cavity round-trip matrix A,D. This phase is determined by the cavity alone, i.e., a function of the distances between and radii of curvature of the mirrors, and of other optical elements where appropriate.

The stability region of the cavity is given by the condition $-1<(A+D)/2<1$. Within the stability region the Gouy phase ranges from 0 to $\pi$ or from $\pi$ to $2\pi$. Within the stability region therefore, any arbitrary quasi-imaging values can be set. A quasi-imaging with $$\psi = \frac{\pi}{2} \text{ or } \frac{3\pi}{2},$$

i.e. $\Delta n=4$, is always present in the centre of the stability region with A+D=0. This case means that an imaging exists after two round trips. The beam transfer matrix for two round trips is $$M^2 = \begin{bmatrix} A & B \\ C & D \end{bmatrix}^2 = \begin{bmatrix} A^2 + BC & B(A+D) \\ C(A+D) & D^2 + BC \end{bmatrix}.$$

The B-term of this matrix vanishes when either the simple round trip is already an imaging, or when A+D=0 for the simple round trip. For example, in such a cavity all modes with mode number $n=0, 4, 8\ldots$ are now resonant at the same time and a field distribution composed of these modes can be excited in the cavity and is reproduced after one round trip.

An imaging cavity is to be understood as a telecentrically imaging cavity with magnification ±1, for which the beam transfer matrix is the positive or negative identity matrix, because only for this case of an imaging the q-parameter is reproduced in one round trip, and so the cavity is stable. It is easy to see that the condition of stability and imaging for a cavity can only be met at the same time by these two cases. A cavity is stable if there is a q-parameter that reproduces itself in accordance with the ABCD law $$q = \frac{Aq+B}{Cq+D}$$

in one round trip with the beam transfer matrix $$M = \begin{bmatrix} A & B \\ C & D \end{bmatrix}.$$

From this condition it follows that $$q = \frac{A-D}{2C} \pm \frac{\sqrt{(A+D)^2-4}}{2C},$$

which makes use of the fact that the determinant of the beam transfer matrix is one: $\det(M)=AD-BC=1$. For the q-parameter to describe a beam, it must have a finite Rayleigh length, i.e. a finite imaginary part. This means that $|A+D|<2$ must be true. The C term can not then be zero, since it follows from $|A+D|<2$ that $AD<1$ and with $AD-BC=1$ it follows that $C \neq 0$. At the edge of the stability range, i.e. $A+D=\pm2$, for the case $AD=1$, i.e. $A=D=\pm1$, $C=0$ can apply without $AD-BC=1$ being violated. Then for the imaginary part of the q-parameter the case $\mathrm{Im}(q)=0/0$ applies and there can be a finite solution. With $A=D=\pm1$, $C=0$ it follows for the q-parameter that $q=q+B$. A solution therefore exists only in case $B=0$ is also true. Any arbitrary q-parameter is then reproduced and the beam transfer matrix is the positive or negative identity matrix. A telecentric imaging with magnification ±1 can therefore only exist at the stability boundary with $A+D=\pm2$. On the other hand an imaging is not necessarily present at the stability boundary, but only if $B=C=0$ also applies. An imaging resonator is not stable in the sense that it does not have a defined eigen-q parameter. Rather, any arbitrary q-parameter is reproduced during a cavity round trip. For this reason an imaging cavity differs fundamentally from a quasi-imaging one. This difference is also reflected in the fact that a quasi-imaging is only defined in a cavity, while an imaging can be realized in an optical system which reproduces an image independently of the q-parameter.

The Gauss-Hermite modes belonging to the eigen-q parameter are eigenmodes of the stable cavity without apertures limiting the field distribution. If apertures are introduced, the Gauss-Hermite modes are no longer eigenmodes. The calculation of the new eigenmodes then typically has to be performed numerically. For the case of a quasi-imaging, in which a class of Gauss-Hermite modes is degenerate, new eigenmodes of the cavity can be constructed as a combination of the degenerate Gauss-Hermite modes. If an obstacle is now introduced into the cavity, then a mode combination therefore remains an eigenmode if the field distribution at the location of the obstacle vanishes. Such an eigenmode then experiences no losses at the obstacle. A field distribution which vanishes on a finite area of an obstacle can only be represented by the combination of infinitely many modes. But it turns out that the field distribution obtained in the case of a finite obstacle can be described by the combination of a small number of degenerate modes, which has only a small field strength at the obstruction position and therefore experiences small losses. Of particular interest is an obstacle on the optical axis of the cavity, which is formed by a hole or a slot in a cavity mirror, or by a separate in- or outcoupling element, and allows direct geometric access to the optical axis of the cavity.

Depending on the geometry of the cavity and Gouy phase, i.e. mode number difference of the quasi-imaging, a plurality of field distributions can be constructed, which avoid an obstacle on the optical axis. First, a distinction must be made between cavities with Cartesian and cylindrical symmetry. For a cavity with cylindrical symmetry the Gauss-Laguerre modes $GL_p^l$ with the radial and azimuthal mode number p and l are eigenmodes of the cavity without an obstacle, for Cartesian symmetry it is the Gauss-Hermite modes $GH_{n,m}$ with the mode numbers in the x- and y-direction n and m. The phase on the axis is given by $\phi_{p,l}=k \cdot L+(2p+l+1) \cdot \psi$ and $\phi_{n,m}=k \cdot L+(1/2+n) \cdot \psi_x+(1/2+m) \cdot \psi_y$ with the Gouy phase $\psi$ and cavity length L. Cylindrical symmetry is realized in linear cavities without astigmatic optical elements, in ring cavities the angle of incidence of the beam on the curved mirrors introduces ellipticity, so that in general $\psi_x \neq \psi_y$ is true. Accordingly, a hole in the mirror can in the first case be implemented as a circular hole, for example, in the second case as a slot. The simplest case for generating a zero at the location of the obstacle by means of a mode combination is to combine the fundamental mode with the next resonant transverse even mode. For $$\psi = \frac{\pi}{2} \text{ or } \frac{3\pi}{2},$$

$\Delta n=4$ and $\Delta p=2$ and the mode combinations are $\sqrt{3/11}\, GH_{0,0} - \sqrt{8/11}\, GH_{4,0}$ and $\sqrt{1/2}\, GL_0^0 - \sqrt{1/2}\, GL_2^0$. For $$\psi = \frac{\pi}{3} \text{ or } \frac{5\pi}{3},$$

$\Delta m=6$ and $\Delta p=3$ and the mode combination are $\sqrt{5/21}\, GH_{0,0} - \sqrt{16/21}\, GH_{6,0}$ and $\sqrt{1/2}\, GL_0^0 - \sqrt{1/2}\, GL_3^0$. For $$\psi = \frac{2\pi}{3} \text{ or } \frac{4\pi}{3},$$

$\Delta n=3$ is indeed true, however the mode $GH_{3,0}$ is odd and in conjunction with the fundamental mode cannot produce a hole on the axis.

The coefficients in front of the modes are given due to the normalization of the power contained in the mode combination to one and due to the conditions that the field on the optical axis vanishes.

The mode combination produces a zero on the optical axis at the position of the obstacle. When propagating in the cavity the modes accumulate a different phase, with the result that the intensity on the axis oscillates with $I(z)=I_{max} \sin^2(\Delta n/2 \cdot \psi(z))$. For the case where the hole is situated in a focussing mirror behind a cavity-internal focus, the intensity at the focus on the axis is a maximum for the case $$\psi = \frac{\pi}{3}$$

and zero for the case $$\psi = \frac{\pi}{2}.$$

The intensity is then a maximum at one Rayleigh length in front of and behind the focus. The mode $GH_{1,0}$ already has a zero on the axis. The width of the slot can be increased by combination with the mode $GH_{5,0}$. The combination that allows the widest slot is $\sqrt{15/23}\,GH_{1,0} - \sqrt{8/23}\,GH_{5,0}$.

FIG. 1 shows the intensity distributions of the different mode combinations in Cartesian and cylindrical geometry at the position of the obstacle (solid line) and at the position of maximum intensity on the optical axis (dashed line). Cartesian geometry: $GH_{00}+GH_{40}$ (a), $GH_{00}+GH_{60}$ (b), $GH_{10}+GH_{50}$ (c). Cylindrical geometry: $GL_0^0+GL_2^0$ (d), $GL_0^0+GL_3^0$ (e). For the cylindrical geometry, for clarity of illustration the distribution is continued for negative radii.

In addition, further higher transverse modes that are resonant can contribute to the field distribution. If this contribution is undesirable, it can be suppressed by apertures which restrict the field distribution from the outside, since the higher transverse modes are spatially more extended.

The mode combinations discussed above are eigenmodes of a cavity for which these modes are degenerate, and with an obstacle on the optical axis, the size of which is assumed to be small. Small size of the obstacle here means that the losses for the combinations of GH or GL modes are to be small, i.e. they are <1/1000. In this case, the mode combinations can be assumed to be eigenmodes of the cavity with obstacle. For the modes shown in FIG. 1 this means an obstacle size of ~1/10 of the Gaussian beam diameter. The Gauss-Hermite modes themselves are no longer eigenmodes in the presence of the obstacle. Further eigenmodes can be constructed by adding other resonant Gauss-Hermite modes. For the case of a quasi-imaging with $\Delta n=4$ in Cartesian geometry the simplest slot mode, i.e. mode combination, which has a zero on the optical axis, is:

$$a_1(x) = \sqrt{\frac{3}{11}}\,GH_{0,0}(x) - \sqrt{\frac{8}{11}}\,GH_{4,0}(x).$$

A further slot mode which also has a zero on the optical axis, and is orthogonal to the first slot mode, can be constructed by adding the next resonant Gauss-Hermite mode:

$$a_2(x) = \sqrt{\frac{280}{2321}}\,GH_{0,0}(x) + \sqrt{\frac{105}{2321}}\,GH_{4,0}(x) - \sqrt{\frac{1936}{2321}}\,GH_{8,0}(x).$$

A further slot mode, orthogonal to the first two, is given by:

$$a_3(x) = \sqrt{\frac{29568}{404909}}\,GH_{0,0}(x) + \sqrt{\frac{11088}{404909}}\,GH_{4,0}(x) +$$

-continued $$\sqrt{\frac{8085}{404909}}\,GH_{8,0}(x) - \sqrt{\frac{356168}{404909}}\,GH_{12,0}(x).$$

These eigenmodes of the cavity with a slot-shaped obstacle on the optical axis and quasi-imaging with mode number difference $\Delta n=4$ are shown in FIG. 2. With increasing mode order these slot modes have more zeros of the electric field, are of greater extent and have a greater intensity near the optical axis. By mixing higher slot modes with the simple slot mode $a_1$ however, the area with low intensity about the optical axis can be increased, so that a wider obstacle is possible with small losses. In addition, the mixing process also changes the spatial overlap with the incoupled beam.

In an advantageous configuration the proposed optical cavity is implemented as a ring cavity having at least two curved mirrors, by means of which the waist radius of the circulating radiation is fixed. Preferably, in this structure the through-opening is formed in one of the curved mirrors. The degeneracy of the desired transverse cavity modes for a fixed cavity length is set by varying the distance between the two curved mirrors.

In principle, the through-opening or the input- or output-coupling element can have any geometric shape. To minimize the losses for the circulating radiation however, in the case of the ring cavity a slotted through-opening or a narrow, for example strip-like, optical output coupling element is to be preferred, the longitudinal extension of which in either case lies in the plane of the beam path. The quasi-imaging is then adjusted in the direction perpendicular to the plane of the beam path. Since the field distribution in the direction of the quasi-imaging extends further than in the other transverse direction, this design allows a smaller angle of incidence at the curved mirrors.

The proposed optical cavity can also be implemented with additional optical elements. For example, additional mirrors can be introduced in order to obtain an additional folding of the cavity for a more compact structure. In one configuration, phase masks are additionally used on at least two mirrors, in order to obtain an intensity maximum on the optical axis at the focus position for the case where a mode combination is used in which the radiation lobes that are opposite with respect to the optical axis oscillate in antiphase (odd mode combination). Such a design is discussed in more detail in the following exemplary embodiments. Thus, phase masks can be applied on a first and a second of the mirrors of the cavity, wherein the second mirror with phase mask is located at the position of an imaging of the first mirror with phase mask. In this way an intensity maximum can be obtained on the optical axis at a position in the cavity for an eigenmode of the cavity with obstacle, in particular between the first and the second or a further mirror and/or at a beam waist of the cavity for which the field strength on the optical axis vanishes at the first mirror.

Of course, the proposed optical cavity can be realized in any desired manner. A partial degeneracy can be adjusted in any stable cavity. The through-opening in this arrangement can be provided in any of the mirrors. The input- or output-coupling element can be arranged at any point in the cavity.

BRIEF DESCRIPTION OF THE DRAWINGS

The proposed optical cavity is explained once again in more detail in the following, on the basis of exemplary embodiments in conjunction with the drawings. These show.

WAYS OF EMBODYING THE INVENTION

Figure 1:
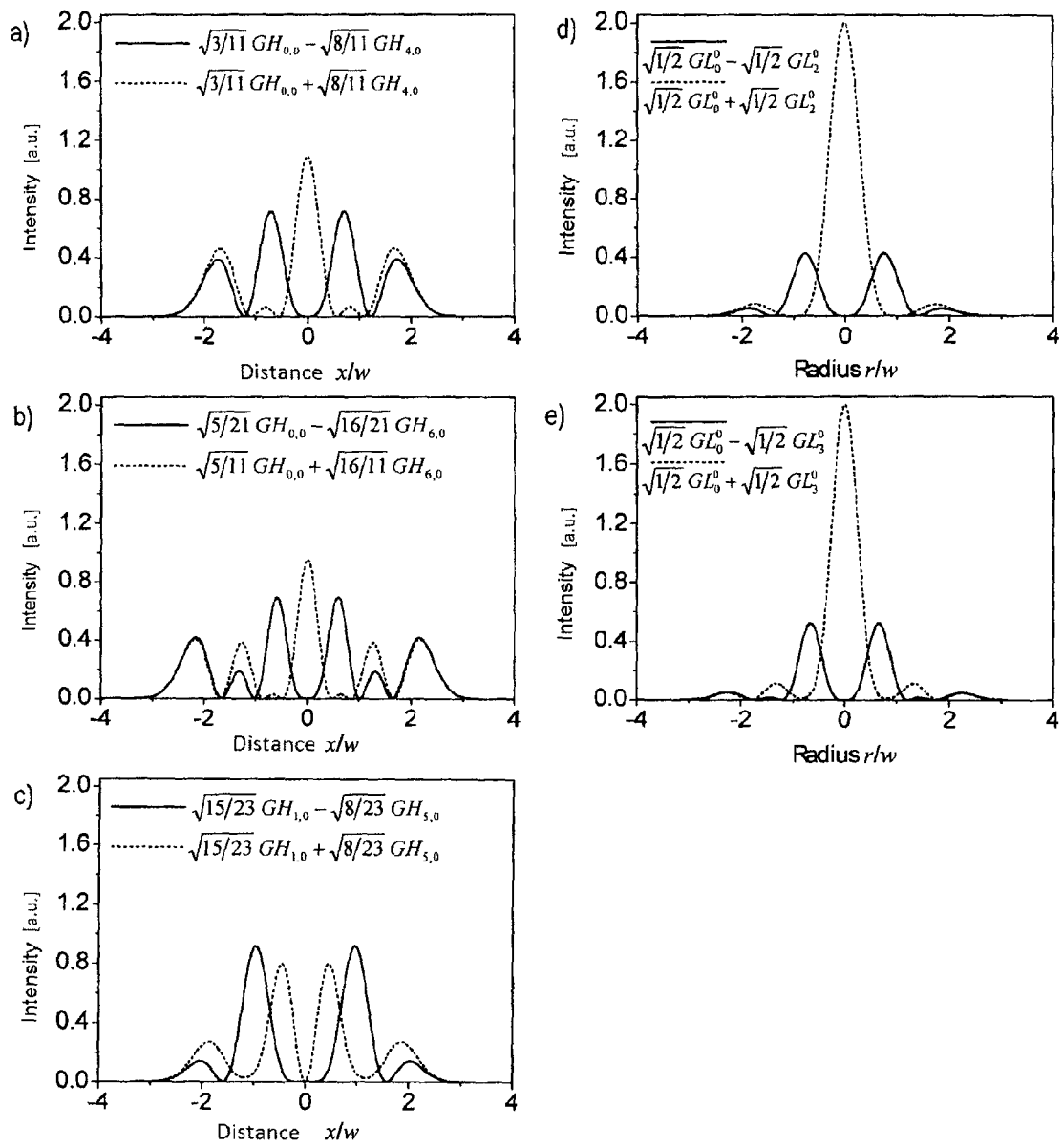
FIG. 1 examples of intensity distributions of the different mode combinations in Cartesian and cylindrical geometry at the position of the obstacle, and at the position of maximum intensity on the optical axis.
Figure 2:
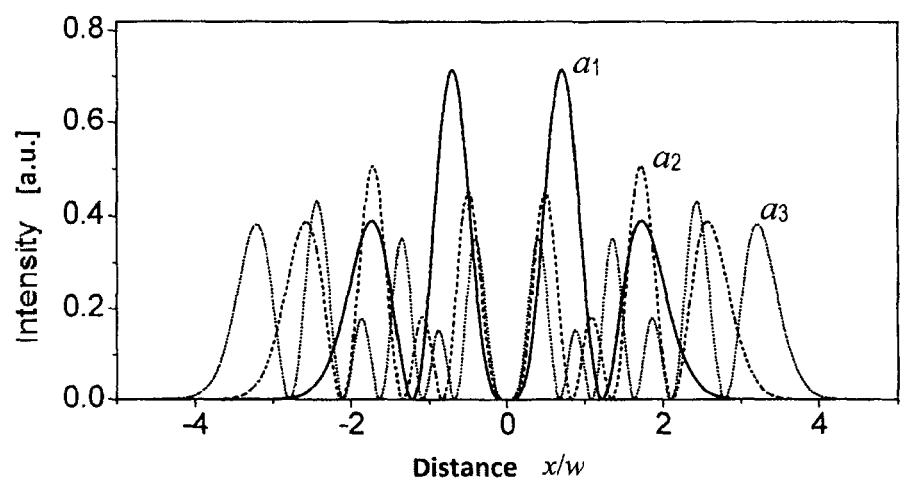
FIG. 2 an example of intensity distributions of a cavity with a slot-shaped obstacle on the optical axis at mode number difference $\Delta n=4$.

The different intensity distributions of FIGS. 1 and 2 have already been explained.

As an example of an imaging cavity the linear symmetric cavity will first be discussed. It is characterized by the resonator length L and the radius of curvature $R_K$ of the two mirrors. The following relation applies:

$$\cos(\psi) = m = 1 - 4\frac{L}{R_K} + 2\frac{L^2}{R_K^2}.$$

Figure 5:
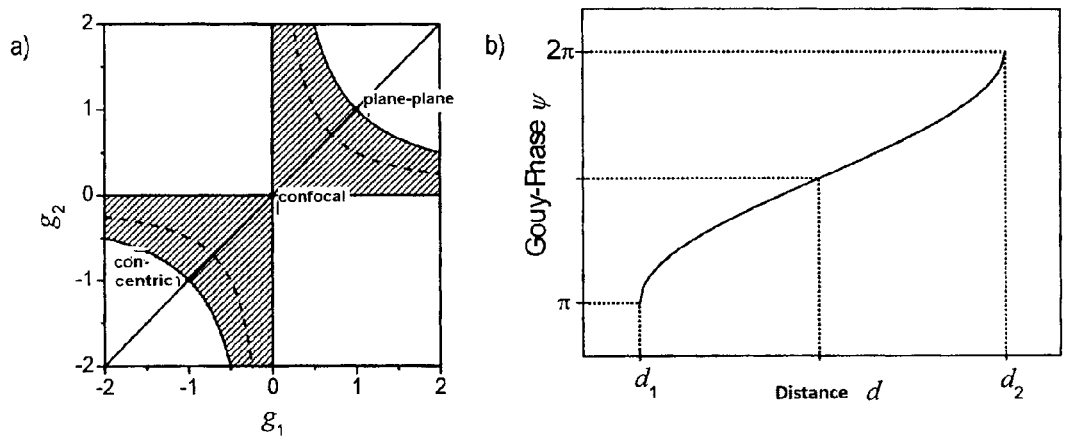
FIG. 5A a stability diagram of a linear 2-mirror cavity.
FIG. 5B the stability region of the ring cavity from FIG. 3.

The stability region is composed of two areas, which for $L=R_K$ are adjacent. The stability limits are therefore the cases of the plane-plane cavity with $L/R_K=0$ (because $R_K \to \infty$), of the confocal cavity with $L=R_K$ and of the concentric cavity with $L=2R_K$. The Gouy phase of the cavity varies from 0 for the plane-plane cavity via $\pi$ for the confocal to $2\pi$ for the concentric cavity. Imaging is only present for the confocal case. At the other stability limits the eigen-q parameter for which the Gouy-Phase is 0 respectively $2\pi$ diverges. The stability diagram is shown in FIG. 5a. For the linear symmetric confocal cavity there is no eigen-q parameter, since each q-parameter reproduces itself after one round trip. One q-parameter ($z_R=L/2$) however is characterized in that it results in an eigen-q parameter in the limit for $L \to R_K$. In general, this is not the case if the imaging condition can be obtained via different stable states which result in different q-parameters in the limit.

In a ring cavity with two focussing mirrors of radius of curvature $R_K$ spaced a distance d apart and with cavity length L, no imaging is possible (except for the case L=2d, which corresponds to the linear cavity). In order to obtain an imaging ring cavity at least one further curved mirror must be added.

An imaging cavity can therefore be realized by a symmetrical-confocal cavity, for which the imaging condition is set with only one parameter, the cavity length—provided that the cavity is not implemented with two cavity arms, which would result in two lengths which must be set. For this cavity the cavity length is predetermined by the radius of curvature. Other possible means of realizing an imaging cavity result in multiple distances which need to be precisely adjusted at the same time to obtain the imaging. A quasi-imaging by contrast can be set in any stable cavity, since within the stability region the Gouy phase will sweep from 0 to $\pi$ or $\pi$ to $2\pi$.

The simplest implementation of a ring cavity is given by a cavity with two curved mirrors with radius of curvature $R_K$ at a distance d apart and with a cavity length L. The Gouy phase is given by $$\psi = \pi + \arccos\left(\frac{2R_K L - 2dL + 2d^2 - R_K^2}{R_K^2}\right).$$

For a fixed cavity length the stability region is defined by the distance d with the stability limits $$d_1 = R_K, \quad d_2 = \frac{L - \sqrt{L^2 - 4R_K L}}{2}.$$

A quasi-imaging with $\psi=3/2\pi$ is present in the centre of the stability region for $$d_0 = \frac{L - \sqrt{L^2 + 2R_K^2 - 4R_K L}}{2}.$$

In this case, the Rayleigh lengths in the short and the long arm of the cavity are $$z_R = \frac{R_K^2}{2L - 4R_K \pm 2\sqrt{L^2 + 2R_K^2 - 4R_K L}}.$$

The associated partial radii are $$w_0 = \sqrt{\frac{\lambda}{\pi}} \frac{R_K}{\sqrt{2L - 4R_K \pm 2\sqrt{L^2 + 2R_K^2 - 4R_k L}}}$$

with the wavelength $\lambda$. Therefore, for a given length L, the focus diameter $w_0$ in the short arm can be specified via the radius of curvature $R_K$ $$R_K = \frac{4\pi w_0^2}{\lambda}\left(\sqrt{\frac{1}{2} + \frac{L\lambda}{4\pi w_0^2}} - 1\right) \approx 2w_0 \sqrt{\frac{\pi}{\lambda}} \sqrt{L}.$$

The radius on the curved mirrors is $$w_1 = \sqrt{\frac{\lambda L}{\pi}} \sqrt[4]{1 - 2\frac{R_K}{L} + \frac{R_K^2}{L^2}} = \sqrt{\frac{\lambda L}{\pi}} \left(1 - \frac{R_K}{2L} - O\left(\frac{R_K^2}{L^2}\right)\right),$$

in other words, to a first approximation, proportional to the square root of the cavity length and independent of the radius of curvature. The focus radius is $$w_0 = \sqrt{\frac{\lambda L}{\pi}} \left(\frac{R_K}{2L} + \frac{R_K^2}{2L^2} + O\left(\frac{R_K^3}{L^3}\right)\right),$$

in other words, to a first approximation, proportional to the radius of curvature. The ratio of the cross sectional areas of the beam is $$\chi = \frac{w_1^2}{w_0^2} = \frac{4(L - R_K)}{L - 2R_K - \sqrt{L^2 + 2R_K^2 - 4R_K L}} \approx 4\frac{L^2}{R_K^2} - 12\frac{L}{R_K}.$$

Because of the angle of incidence of the beam on the curved mirrors the effective radii of curvature in the two transverse directions are different so that the stability regions are displaced relative to one another. The effective radii of curvature are $R_{K,m}=R_K \cos(\alpha)$ and $R_{K,s}=R_K/\cos(\alpha)$ in the meridional and sagittal direction with the angle of incidence α to the surface normal of the mirror. The above equations apply to the effective radii of curvature in the respective direction. At the stability edge the beam is therefore highly elliptical. If the angle of incidence is small, for the quasi-imaging in a transverse direction, the other direction is also near the middle of the stability region and the beam is approximately round. To be able to choose a small angle of incidence at the curved mirrors, the quasi-imaging can be set in the direction perpendicular to the plane of the beam path. The field distribution extends further in this direction than in the other transverse direction, in which the fundamental mode is excited. The slot in the mirror is then located in the plane of the beam. This arrangement is sketched in FIG. 3. FIG. 5b shows the associated stability region.

Figure 3:
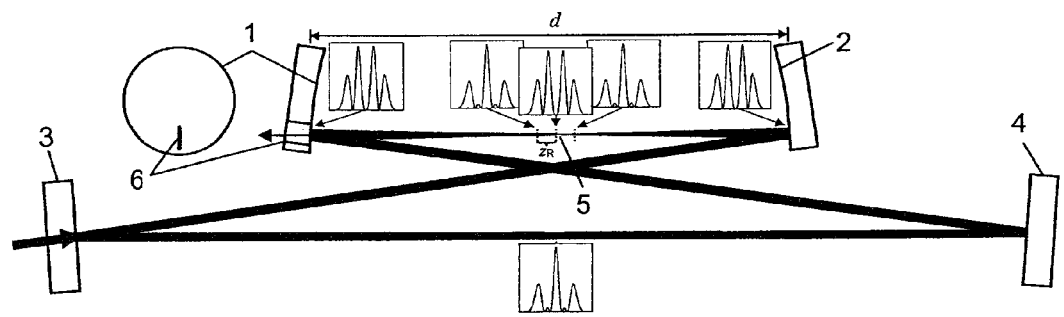
FIG. 3 an example of a configuration of the proposed optical cavity as a ring cavity.

FIG. 3 shows an example of a possible design of the proposed optical cavity as a ring cavity. The cavity consists of two curved mirrors 1, 2 (focussing mirrors) with radius of curvature $R_K$ and two plane mirrors 3, 4. One of the two plane mirrors 3 is used as an input coupling mirror for the fundamental radiation coupled into the cavity, the beam path of which is shown in the Figure. By means of the two focussing mirrors 1, 2 a focus 5 is produced in the cavity between the two focussing mirrors. In one of the two focussing mirrors 1 (output coupling mirror) a slot 6 is formed, through which radiation can be coupled out of the cavity. This is indicated by the arrow. By the addition of further plane mirrors the cavity length L can be increased with a compact design. The beam path lies in a plane. The angle of incidence α of the beam on the focussing mirrors 1, 2 is small and the same size for both mirrors. If the distance d of the focussing mirrors 1, 2 is set correctly according to the cavity length and the effective radius of curvature $R_K/\cos(\alpha)$, a quasi-imaging is obtained perpendicular to the plane of the drawing with the Gouy phase $\psi=3/2\pi$, wherein in the short arm the phase accumulated is approximately $\psi=\pi$ and in the long arm approximately $\psi=1/2\pi$. The small images show the intensity distribution of the mode combination of $GH_{0,0}$ and $GH_{4,0}$ (see FIG. 1a) in the transverse direction perpendicular to the plane of the drawing at selected positions. Access to the optical axis is obtained through the slot 6 in one of the focussing mirrors 1. This access can be used, for example, for coupling out high harmonics which are generated in the region of the focus with Rayleigh length $z_R$ in a gas jet. The width of the slot 6 is approximately 1/10 of the Gaussian beam diameter. The output coupling mirror with slot 6 is additionally shown in plan view. The spatial overlap of the field distribution with an incident Gaussian beam with the eigen-q parameter of the cavity is 27%. By adjusting the q-parameter of the Gaussian beam in the direction of the quasi-imaging an overlap of 44% is obtained.

Figure 4:
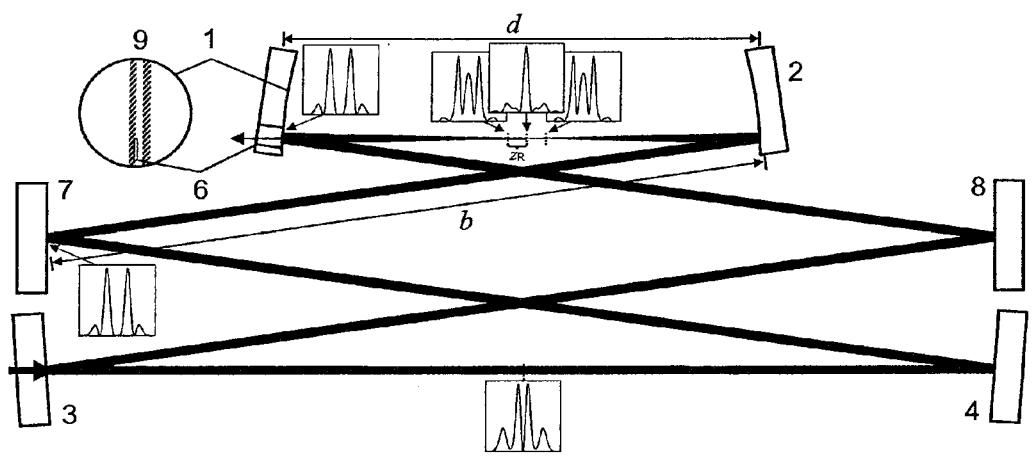
FIG. 4 another example of a configuration of the proposed optical cavity as a ring cavity with additional phase masks.

In a quasi-imaging cavity additional optical elements can be inserted. For example, the concept can be combined with the proposal of mounting phase masks onto mirrors, in K. D. Moll, R. J. Jones, J. Ye, "Output coupling methods for cavity-based high-harmonic generation," Opt. Expr. 14 (2006). Such a cavity allows a wider slot than the design in FIG. 3 and results in an intensity maximum on the optical axis in focus. An advantageous arrangement of such a cavity is shown in FIG. 4. This cavity is also implemented as a ring cavity, wherein compared to the cavity of FIG. 3 two additional plane mirrors 7, 8 are used. Here, both the curved output coupling mirror 1 with the slot 6 and the additional plane mirror 7, arranged at a distance b from the second curved mirror 2, carry a phase mask 9. The other plane mirrors are required because a plane mirror with phase mask 9 must be placed at a predetermined distance b from the focussing mirror, without specifying the cavity length. The distance d between the focussing mirrors 1, 2 is chosen such that depending on L and $R_K/\cos(\alpha)$, in the plane perpendicular to the plane of the drawing a quasi-imaging is realized with $\psi=3/2\pi$. The distance b is chosen such that the plane mirror 7 with phase mask 9 is located at the position of the imaging of the output coupling mirror 1. To achieve this, the Gouy phase which lacks between the focussing mirrors 1, 2 at $\psi=\pi$ must be accumulated on the path b. On the other path between the mirrors with phase masks 9 the Gouy phase $\psi=\pi/2$ is accumulated, so that a mode combination with Δn=4 is reproduced. Here the mode combination can be chosen from the odd-numbered Gauss-Hermite modes $GH_{1,0}$ and $GH_{5,0}$ (see FIG. 1c), which allows a wide slot. The slot width can have a value of 2a=0.28·2w of the Gaussian beam diameter for losses of $T^2=0.999$. If the lobes of the mode combination are set in phase by the phase mask on the flat mirror, an intensity maximum is obtained in the focus position on the optical axis. The field distribution of this mirror is reproduced on the output coupling mirror 1 and the mode combination is again established by means of the additional phase mask. The output coupling mirror 1 with slot 6 and phase masks 9 is also drawn in plan view. The shaded areas are those in which the phase must be caused to lag by π. Approximately in the centre of the long cavity arm the intensity of the mode combination is concentrated near the optical axis. There the spatial overlap is 82% with a Gaussian beam with a matched q-parameter, for which one half of the beam profile is shifted in phase with a phase mask by π relative to the other. The small images show the intensity distribution in the transverse direction perpendicular to the plane of the drawing at selected locations.

FIG. 5a shows the stability diagram of a linear 2-mirror cavity, shown as a function of the g-parameters $g_1=1-L/R_{K,1}$, $g_2=1-L/R_{K,2}$. The stable region $0<g_1g_2<1$ The stable region are not stable except for the confocal point. The symmetric case $R_{K,1}=R_{K,2}$ with the concentric, confocal and plane-plane cavity is plotted as a diagonal line. A quasi-imaging with ψ=1/2π (1st quadrant) respectively ψ=3/2π (3rd quadrant) is present on the dashed line. While the imaging confocal case is a particular point on the stability boundary, a quasi-imaging lies in the middle of the stability region. In order to achieve the condition, the cavity length L must be precisely adjusted. Quasi-imaging with other Gouy phases are also described by hyperbolas in the g-parameter diagram.

FIG. 5b shows the stability region of the ring cavity of FIG. 3. The Gouy phase sweeps from π to 2π. The eigen-q parameter diverges at the stability boundaries. In the middle of the stability region a quasi-imaging with ψ=3/2π is present. A simultaneous resonance of different transverse modes is present dependent on the finesse for only a fraction of the stability range $d_2-d_1$.

For a quasi-imaging with the Gouy phase per cavity round trip ψ=3/2π the field distribution of the one focussing mirror is reproduced approximately on the other focussing mirror, so that a cavity can be realized with two slots in both focussing mirrors. The Gouy phase accumulated between the focussing mirrors, however, is not exactly π, but somewhat smaller depending on the Rayleigh length and the distance between the mirrors. For a ring cavity with two focussing mirrors with radius of curvature $R_K$ and cavity length L, when the quasi-imaging is set, this difference is $$\Delta\psi = \pi - 2\arctan\left(\frac{L}{R_K} + \frac{\sqrt{L^2-4R_KL+2R_K^2}}{R_K} - 1\right) \approx \frac{R_K}{L}.$$

This phase difference results in losses at the slots, which can be estimated as follows. The power losses by clipping of the field at the slot are $$T(a,\psi) = \int_\Omega |u(\xi,\psi)|^2 \, d\xi$$

as a function of a, representing the half of the slot-width, and the phase between the two participating modes ψ. The integration interval Ω excludes the slot. The overlap of the clipped field with the original one is once again T, so that the total losses at a slot are given by $T^2(a,\psi)$. The losses are a minimum when the same deviation is present at both slots relative to the case with vanishing intensity on the axis (ψ=0). The losses at the two slots are in each case $T^2(a, \Delta\psi/2)$. The losses for small ψ and a can be written as $$T^2(a,\psi) = 1 - c\frac{a}{w}\psi^2.$$

For the mode combination $\sqrt{3/11}\ GH_{0,0} - \sqrt{8/11}\ GH_{4,0}$ the condition $$c = \frac{192}{11}\sqrt{\frac{2}{\pi}} = 14$$

is true. With $R_K$=150 mm, L=3850 mm and a/w=0.1, Δψ=0.04 and therefore $$T^2(a, \Delta\psi/2) = 1 - 14\frac{a}{w}\left(\frac{\Delta\psi}{2}\right)^2 = 0.99944.$$

With the losses at both aperture $T^4$=0.99888, the maximum achievable enhancement is P=900, where this value must then be multiplied with the spatial overlap during input coupling.

Of crucial importance for the experimental realization of a cavity with an obstacle on the optical axis by quasi-imaging is the question of how exactly the Gouy phase, and hence the geometric distances between the optical elements, must be set. The required accuracy increases with the finesse of the cavity. If there are multiple Gauss-Hermite modes propagating independently of each other in the cavity that are to be enhanced simultaneously, the phase difference Δn·δψ, which is given by the mode number difference Δn and the detuning relative to the quasi-imaging δψ, must be less than the width of the resonance curve, which is defined by the finesse of the cavity $$F = \frac{2\pi}{1-RR_1}.$$

The resonance curve for a Gauss-Hermite mode is given by $$P(\phi) = \frac{1-R_1}{1+RR_1-2\sqrt{RR_1}\cos(\phi)},$$

with reflectivity of the input coupling mirror $R_1$ and cavity losses R. The width of this curve is $$\Delta\phi = \frac{2\pi}{F}.$$

In the following, the term resonance curve shall designate the enhancement P as a function of the round-trip phase φ. This phase will be adjusted via the cavity length L in accordance with φ=kL the wave number k, which at high finesse must be controlled to fractions of a nanometer. This is possible by active regulation of the cavity length. In order to discriminate between these, the enhancement as a function of the detuning δψ relative to the quasi-imaging will be designated as a detuning curve, wherein when traversing the detuning curve at every point the attainment of the resonance by adjustment of the cavity length is assumed. The width of this detuning curve as a function of the distances to be set between optical elements is order of magnitudes greater than for the resonance curve as a function of the cavity length. For typical enhancement cavities of high finesse as in Table 1 this is in the range of microns. Therefore no active locking to the Gouy phase is required, but the adjustment can be done manually. For the ring cavity shown in FIG. 3 the detuning of the Gouy phase relative to the quasi-imaging with ψ=3/2 π is given by a detuning of the separation δ of the focussing mirrors with $$\delta\psi = \frac{2}{R_k^2}\sqrt{L^2-4R_kL+2R_k^2}\ \delta.$$

For the parameters specified in Table 1, $\delta\psi=0.315\ \delta$/mm.

TABLE 1

Typical parameters for a fs-enhancement cavity for generating high harmonics. The cavity is a ring cavity as in FIG. 3.

| | |
|---|---|
| Repetition rate $\nu_{rep}$ | 78 MHz |
| Wavelength $\lambda$ | 1042 nm |
| Pulse duration $\tau$ | 200 fs |
| Cavity length $L = c/\nu_{rep}$ | 3850 mm |
| Radius of curvature of the focussing mirrors $R_K$ | 150 mm |
| Focal radius $w_0$ | 22 μm |
| Beam radius at the focussing mirrors $w_1$ | 1.11 mm |
| Spherical aberration $\Delta\phi_w$ | 0.678 mrad |
| Reflectivity of the incoupler $R_1$ | 0.9986 |
| Cavity losses R | 0.99953 |
| Finesse of the cavity without obstacle F | 3400 |

If there are only losses r in a cavity which act uniformly on the amplitude of the electric field (such as the reflection coefficient of a mirror), then the transverse modes circulate in the cavity independently of each other. A light beam incident on the cavity is projected onto the orthogonal function system of the cavity modes which are enhanced by different amounts depending on the round-trip phase $\phi$. This is the situation, for example, when an image is to be enhanced in a degenerate cavity. If in such a cavity two Gauss-Hermite modes with mode number difference $\Delta n$, whose resonances are shifted relative to each other by a detuning $\delta\psi$ relative to the quasi-imaging, are both to be equally enhanced, both must be shifted from their resonance by half the phase difference $\Delta n \cdot \delta\psi/2$. The enhancement of this mode combination as a function of the detuning is then $$P(\delta\psi) = U \frac{1-R_1}{1+RR_1-2\sqrt{RR_1}\cos(\Delta n/2 \cdot \delta\psi)}$$

with the spatial overlap U between the incoupled beam and the circulating field. The width of this detuning curve is given by $$\Delta\psi = \frac{2}{\Delta n}\frac{2\pi}{F}.$$

For a finesse of F=3000 and $\Delta n=4$, $\Delta\psi=1$ mrad and the width of the detuning curve $\Delta\delta=3$ mm·$\Delta\psi=3$ μm.

If an obstacle is introduced into the cavity, this consideration is no longer allowed, because the cavity modes are coupled to one another by the obstacle. The result is that the detuning curve becomes broader. The projection of one Gauss-Hermite mode onto another is no longer zero if a part of the integration range is set to zero by an obstacle. With this consideration, the detuning curve P ($\delta\psi$) can be modelled.

This will be discussed using the example of the quasi-imaging with $\psi=3/2\pi$ and the mode combination $GH_{0,0}+GH_{4,0}+GH_{8,0}$. The circulating field distribution is described by the complex coefficients $c_0$, $c_4$, $c_8$ for the normalized Gauss-Hermite modes $u_0$, $u_4$, $u_8$, which are close to the resonance. The modes $u_1, u_2, u_3$ and $u_5, u_6, u_7, \ldots$ are not resonant and can therefore be neglected. Higher resonant modes $u_{12}, u_{16}, \ldots$ are suppressed from the outside by apertures and are therefore not taken into account. The indices relate only to the transverse direction, in which the quasi-imaging is present and in which the apertures act. In the direction perpendicular thereto a fundamental mode and no apertures are assumed.

Apertures are used to couple the modes to one another. This coupling is described by a matrix T, the elements of which are the overlap integrals $$t_{k,l} = 2\int_a^{A_B} u_k(x) \cdot u_l^*(x) dx$$

between the Gauss-Hermite modes, taking into account the apertures. In this equation a refers to half the width of the slot on the optical axis and $A_B$ to the radius of a further aperture, which limits the field distribution from the outside (see FIG. 6).

Figure 6:
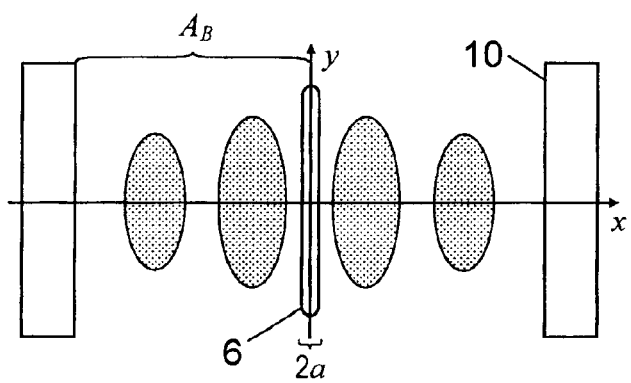
FIG. 6 an example of a measured intensity distribution on a mirror with through-opening of a proposed optical cavity.

FIG. 6 shows the intensity distribution on the output coupling mirror with slot width 2a on the optical axis. Apertures are located at a distance $A_B$ from both sides of the optical axis 10, which limit the field distribution from the outside. Shown is the slot mode $GH_{0,0}+GH_{4,0}$ for quasi-imaging in the x-direction. The distance of the lobes from the optical axis for this simple slot mode is $x=\sqrt{1/2}\ w$ and $x=\sqrt{3}\ w$. The slot width in the image is 2a=0.1·2w, the distance between the apertures $A_B$=3·w.

T is a real number and symmetrical for Gauss-Hermite modes with the same q-parameter. Because the modes under consideration are even functions, it is sufficient to consider only half of the integration interval. Because of the orthonormality of the Gauss-Hermite modes, the matrix T for disappearing apertures is the identity matrix. If apertures are present, due to clipping of the field the values of the diagonal terms are less than one and the non-diagonal elements are non-zero. Due to this coupling a power transfer can be effected between the different modes, as is required, for example, if the incoupled beam $u_{in}$ overlaps only with the fundamental mode $u_0$, but the circulating field is composed of $u_0$ and $u_4$, to minimize the losses at the slot on the optical axis. In a round trip, for a detuning relative to the quasi-imaging of $\delta\psi$ in accordance with their mode number the modes accumulate a different phase, which is described by the matrix $\Psi$. In this expression $\Psi_{k,k}=\exp(i\ k\ \delta\psi)$. The coefficients $c_0$, $c_4$, $c_8$, which describe the circulating field distribution, can be determined from the condition that the sum of the coefficients transformed by a round trip and the input coupling must again yield the coefficients:

$$r_1\begin{bmatrix}t_{0,0} & t_{0,4} & t_{0,8}\\ t_{4,0} & t_{4,4} & t_{4,8}\\ t_{8,0} & t_{8,4} & t_{8,8}\end{bmatrix}re^{i\phi}\begin{bmatrix}1 & 0 & 0\\ 0 & e^{i4\delta\psi} & 0\\ 0 & 0 & e^{i8\delta\psi}\end{bmatrix}\begin{bmatrix}c_0\\ c_4\\ c_8\end{bmatrix}+i\sqrt{1-r_1^2}\begin{bmatrix}b_0\\ b_4\\ b_8\end{bmatrix}=\begin{bmatrix}c_0\\ c_4\\ c_8\end{bmatrix}.$$

This equation can be written in the form $M\cdot\vec{c}=\vec{b}$ and solved numerically. The round trip is described by the coupling of the modes at the slot T, the phase $\psi$ induced by the detuning, the additional amplitude losses r and the reflection at the input coupling mirror with reflection coefficient $r_1$. The input coupling is given by the overlap of the incoupled beam with the modes $$b_k = \int_{-\infty}^{\infty} u_k(x) \cdot u_{in}^*(x) dx$$

and the transmission through the input coupling mirror with the transmission coefficient $t_1=\sqrt{1-r_1^2}$. The phase $\phi$ is chosen such that the enhancement P is a maximum. The enhancement is given by the sum of the squares of the moduli of the coefficients:

$$P = P_c / P_{in} = \sum_k |c_k|^2$$

This derivation is analogous to the derivation of the resonance curve, which applies to a single cavity mode described by only one coefficient, the circulating field strength $E_c$. From the condition that the circulating field in the stationary case reproduces itself after one round trip, the enhancement can be derived. The field is described by a expansion according to Gauss-Hermite modes, since it is only for these modes that the Gouy phase is defined as the phase additionally accumulated on the axis during propagation.

Figure 7:
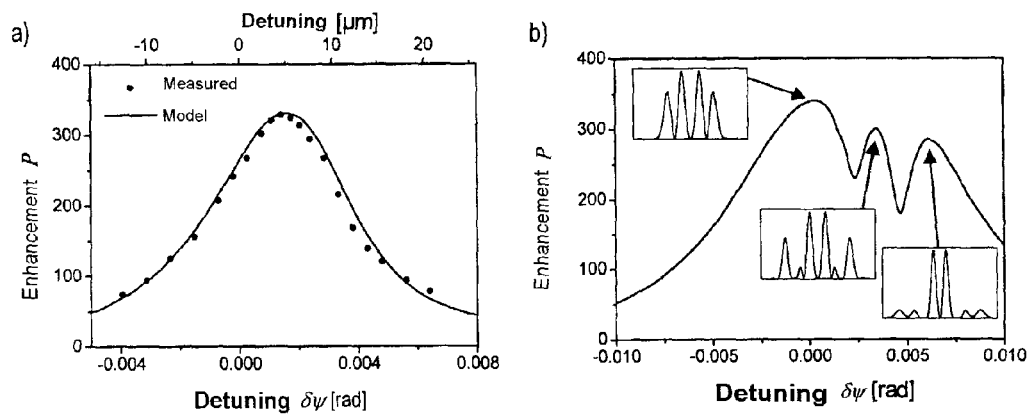
FIG. 7 measurement data and detuning curve based on a model of a proposed optical cavity with an additional mode aperture (sub-figure a) and without additional mode aperture (sub-figure b)

FIG. 7 shows the enhancement as a function of the detuning relative to the quasi-imaging. FIG. 7a shows both measurement data (dots) and the modelled values (solid line) for the detuning curve. The parameters are listed in Table 1. The slot is implemented by a wire on the optical axis with the ratio of slot width to beam diameter of 2a/2w=0.051. An aperture, which crops the field distribution from the outside, is at a distance $A_B/w=2.9$ from the optical axis. The input coupling is carried out with the fundamental mode at the eigen-q-parameter of the cavity. The finesse of the cavity at the maximum of the detuning curve is F=3000, which represents only a slight drop compared to the finesse of the cavity without wire of F=3360. The reason why the enhancement is only P=330, compared to P=1400 for the fundamental mode without wire, is to be found in the spatial overlap of the circulating field distribution with the incident Gaussian beam of approximately 3/11, which can be improved by matching of the incident beam. The circulating power is 450 W. The full spectrum of the incident beam is enhanced in the cavity, so that the circulating pulse length is 200 fs.

FIG. 7b shows the calculated detuning curve in the absence of an aperture which restricts the field distribution from the outside, and taking account of the spherical aberration. The parameters are those listed in Table 1. The slot width is 2a/2w=0.1. Here the modes $u_0$, $u_4$, $u_8$, $u_{12}$ were considered. The small images show the intensity distribution at the three maxima of the detuning curve.

Figure 8:
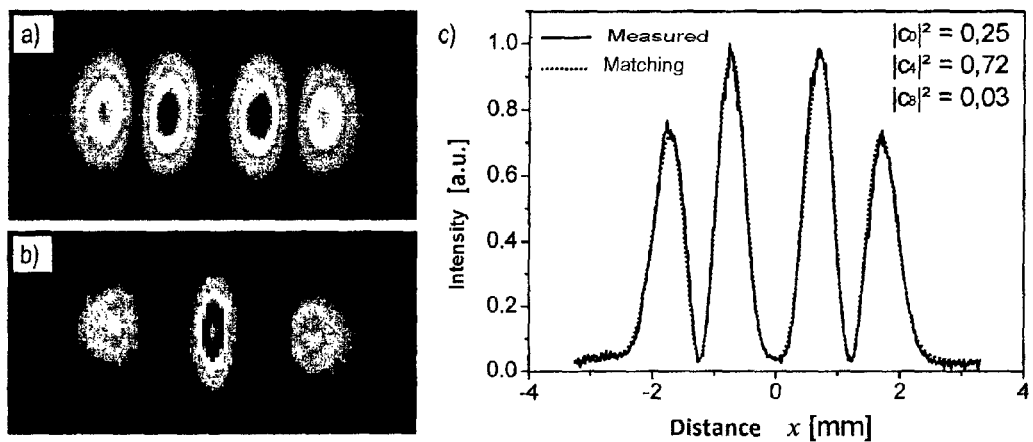
FIG. 8 the measured intensity distribution of the enhanced field of a proposed optical cavity at the maximum enhancement at the position of the obstacle on the optical axis (sub-figure a), at the position of maximum intensity on the optical axis (sub-figure b) and diagram of the correspondence between measurement and model data (sub-figure c)

FIG. 8 shows the measured intensity distribution of the enhanced field at the position of the aperture on the optical axis (realized by a wire) in sub-FIG. 8a and at the position of maximum intensity on the optical axis in sub-FIG. 8b. Sub-FIG. 8c shows a matching of the mode combination $u_0$, $u_4$, $u_8$ to a section of the intensity distribution from sub-FIG. 8a. The magnitudes of the three Gauss-Hermite modes are indicated.

Also, the effect of the spherical aberration on the curved mirrors can be taken into account in this model. Let the difference between a spherical and an ideal parabolic phase be $\Delta\phi(x)$. This phase error leads to a coupling of the modes, which can be described by a matrix S with the terms $$s_{k,l} = 2 \int_0^\infty u_k(x) \cdot \exp(i\Delta\phi(x)) \cdot u_l^*(x) dx,$$

$$\Delta\phi(x) = -2 \frac{1}{8} \frac{k}{R_K^3} x^4.$$

The effect of the spherical aberration can be quantified by the variable $$\Delta\phi_w = \frac{1}{4} \frac{k w_1^4}{R_K^3}.$$

With the radius of curvature $$R_K \approx 2w_0 \sqrt{\frac{\pi}{\lambda}} \sqrt{L}$$

and the beam radius on the curved mirrors $$w_1^4 \approx \frac{\lambda^2 L^2}{\pi^2}$$

it follows that $$\Delta\phi_w \approx \frac{1}{16} \left(\frac{\lambda}{\pi}\right)^{\frac{5}{2}} \frac{\sqrt{L}}{w_0^3}.$$

$\Delta\phi_w$ therefore depends to a first approximation on the square root of the cavity length L and the cube of the reciprocal of the focal radius $w_0$.

For small $\Delta\phi_w$, the spherical aberration results to a first approximation in an additional phase for the higher transverse modes. The terms of the non-diagonal elements of S are small and the diagonal elements have values of approximately 1. The result of this is that not all the participating modes are exactly on resonance at the same detuning $\delta\psi$ and the detuning curve has multiple maxima, at which different modes are simultaneously resonant (see FIG. 7b). The phase which the modes additionally accumulate due to the spherical aberration is given by $\arg(s_{0,0})=-0,2\cdot\Delta\phi_w$, $\arg(s_{4,4})=-7,7\cdot\Delta\phi_w$, $\arg(s_{8,8})=-27,2\cdot\Delta\phi_w$. If the contribution of higher transverse modes is not desired, it can be suppressed by apertures, which clip the field distribution from the outside.

In the case of larger amounts of aberration ($\Delta\phi_w>1$ mrad for a finesse of ~3000) the deviation of the value of the diagonal element of the matrix from 1 becomes noticeable, which causes additional losses. These amounts are $|s_{0,0}|=1-0,2\cdot\Delta\phi_w^2$, $|s_{4,4}|=1-36\cdot\Delta\phi_w^2$ and $|s_{8,8}|=1-378\cdot\Delta\phi_w^2$ in the first approximation. As expected due to the greater transverse extent, the losses for the $GH_{4,0}$ mode are considerably larger than for the fundamental mode. The factor is 180. The limitation of the finesse by the spherical aberration is consequently much more critical for a slot mode than for operation in the fundamental mode.

Figure 9:
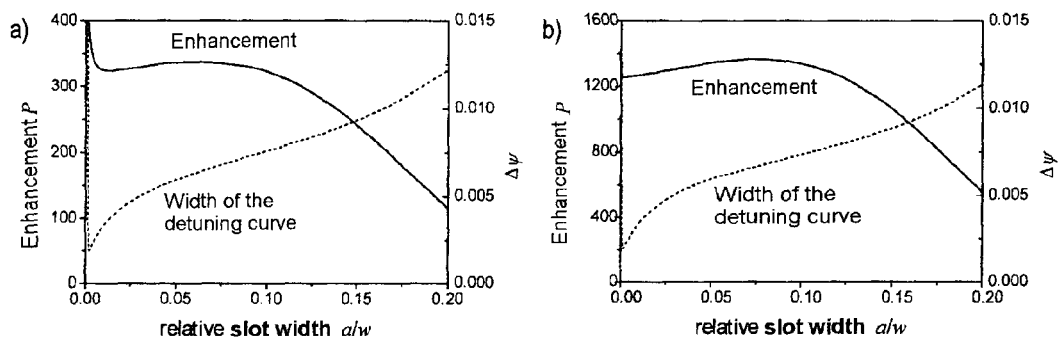
FIG. 9 the calculated enhancement and width of the detuning curve as a function of the slot width for different modes of the incoupled beam.

With increasing width of the obstacle on the optical axis, the losses for the modes become larger, causing a decrease in the enhancement. An increasing width also causes an increasing coupling of the modes with one another, and thus a broader detuning curve. If the spherical aberration is taken into account, i.e. the modes $u_0$, $u_4$, $u_8$ cannot be resonant at the same time, the enhancement even shows a maximum for a finite slot width. FIG. 9 shows the calculated enhancement P and the width $\Delta\psi$ (FWHM) of the detuning curve as a function of the slot width 2a in relation to the beam diameter 2w with the parameters from Table 1. In sub-FIG. 9a the incoupled beam is the fundamental mode at eigen-q parameter ($b_0=1$), in sub-FIG. 9$b$ the incoupled beam is identical to the circulating slot mode ($b_0=\sqrt{3/11}$, $b_4=-\sqrt{8/11}$). For a=0 the enhancement does not depend on the Gouy phase. With increasing slot width the width of the detuning curve increases. The enhancement shows a maximum at a finite slot width. This behaviour occurs only if the spherical aberration is taken into account. For the parameters in Table 1 the slot width can therefore be approximately 1/10 of the beam diameter, without the enhancement breaking down. This width is significantly larger than would be possible for the $GH_{1,0}$, or than the diameter of the hole would have to be for the fundamental mode, in order to achieve the same enhancement.

Apertures which clip the field distribution from the outside can suppress the contribution of higher transverse modes. In addition to the aperture radius $A_B$ in relation to the beam radius, the influence of these apertures on the enhancement also depends on the position of the aperture along the propagation direction. A shift of the aperture towards the location of the obstacle on the optical axis by the Gouy phase $\psi$ is described by $$r_1 r e^{i\phi} \Psi(\psi) \cdot T_{A_B} \cdot \Psi(-\psi) \cdot S \cdot T_a \cdot S \cdot \Psi(\delta\psi) \vec{c} + i\sqrt{1-r_1^2}\vec{b} = \vec{c}.$$

Figure 10:
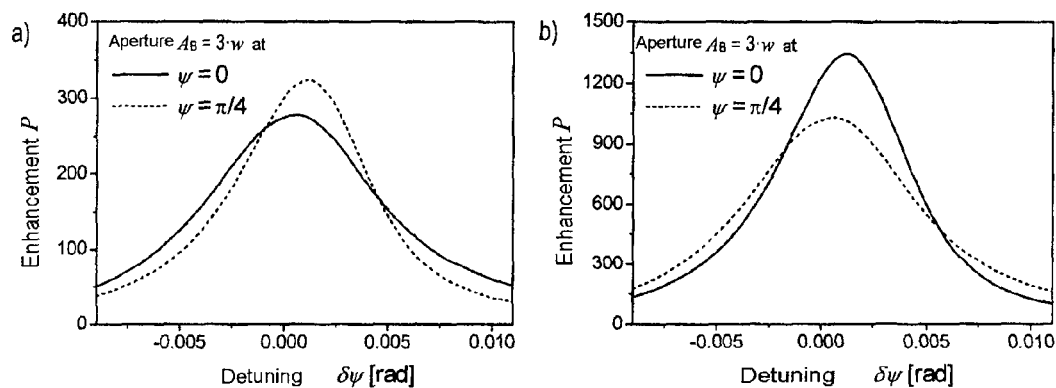
FIG. 10 the calculated detuning curve for a ring cavity at different aperture positions for different modes of the incoupled beam.

A calculation gives the detuning curves shown in FIG. 10 for a ring cavity with the parameters from Table 1 with a slot width 2a/2w=0.1 on the optical axis and a further aperture at a distance of $A_B/w=3$ from the axis at the position of the slot (solid line), and at the position of maximum intensity on the axis (dashed line), i.e. shifted by the Gouy phase $\psi=\pi/4$. In sub-FIG. 10($a$) the incoupled beam is the fundamental mode at the eigen-q-parameter ($b_0=1$), in sub-FIG. 10($b$) the incoupled beam is the circulating slot mode ($b_0=\sqrt{3/11}$, $b_4=-\sqrt{8/11}$). The enhancement for the case where the aperture is positioned at the location of the obstacle on the optical axis ($\psi=0$), and for the case where it is located at the position of maximum intensity on the axis ($\psi=/\pi 4$), are markedly different. Which position is more favourable depends on the incoupling. For the input coupling with the fundamental mode at the eigen-q parameter the position of maximum intensity on the axis allows a larger enhancement, for the input coupling with the slot mode the enhancement is greater if the aperture is placed at the location of the obstacle.

The proposed optical cavity has a direct geometric access on the optical axis, which leads to low losses in the cavity. A direct geometric access to the optical axis, compared with other options for the input- or output-coupling of radiation, in particular of higher harmonics such as, for example, XUV-radiation, has the advantage that no dispersion or non-linearity is introduced and the cavity is therefore scalable to large circulating mean and peak pulse powers. The quasi-imaging used allowed the geometric access to the optical axis of the cavity with small losses at a hole or slot or a reflective input- or output-coupling element. A circulating field distribution can be excited which has a position of maximum intensity on the optical axis and which is therefore suitable, for example, for generating high harmonics. The quasi-imaging can be adjusted in any stable cavity and can thus be implemented in a simple manner. If a ring cavity with two curved mirrors is used, the quasi-imaging can be easily adjusted, since it depends on only one parameter, the distance between the curved mirrors for a constant cavity length. This configuration has been successfully implemented experimentally with a finesse of >3000. The distance between the curved mirrors in this arrangement need only be adjusted to within a few µm, so that the adjustment can be carried out manually.

The degeneracy of transverse modes in a cavity with quasi-imaging, together with suitable apertures, allows mode combinations with large intensity gradients and sharply localized intensity maxima or minima to be selectively excited. Compared to simple transverse modes, which also have greater intensity gradients than the fundamental mode, these mode combinations change their appearance during propagation. The intensity on the axis oscillates, for example when two Gauss-Laguerre modes are combined, so that an intensity maximum or minimum is formed at the focus, which is strongly localized in both the radial and axial directions. Such field distributions can be used for example as dipole traps for neutral atoms. They can also be generated in a defined manner in an active cavity by adjustment of a quasi-imaging and corresponding apertures, and then be used for applications in which the strong localization is advantageous, such as for example in laser beam scanning microscopy. Of course, the proposed optical cavity can also be used as an active cavity for other applications.

List of Reference Numerals 1 first focussing mirror (output coupling mirror)
2 second focussing mirror
3 plane mirror
4 plane mirror
5 focus
6 slot
7 additional plane mirror
8 additional plane mirror
9 phase mask
10 aperture

The invention claimed is:

1. An optical enhancement resonator for non-linear processes composed of multiple mirrors, by means of which an optical axis is specified,
   which has at least one obstacle on the optical axis in the form of a through-opening in one of the mirrors or of an incoupling or outcoupling element, wherein the mirrors are selected and arranged such that
   the resonator is stable and
   without the obstacle has first transverse eigenmodes,
   wherein said first transverse eigenmodes comprise transverse eigenmodes with at least three different resonance frequencies, and by means of the obstacle by combination of the first transverse eigenmodes of a resonance frequency new eigenmodes are produced which have an intensity minimum at the position of the obstacle.

2. The optical enhancement resonator according to claim 1, characterized in that
   the mirrors are arranged in such a way that a mode combination is obtained from the fundamental mode with the nearest resonant transverse first even eigenmode of the resonator without the obstacle.

3. The optical enhancement resonator according to claim 2, characterized in that
   the mirrors form a ring resonator, the optical axis of which lies in a plane and which has two curved mirrors.

4. The optical enhancement resonator according to claim 1, characterized in that
   the mirrors form a ring resonator, the optical axis of which lies in a plane and which has two curved mirrors.

5. The optical enhancement resonator according to claim 4, characterized in that
   the through-opening is implemented as a slot which extends in the plane of the optical axis, wherein a decomposition of the transverse first eigenmodes is set in a direction perpendicular to the plane of the optical axis.

6. The optical enhancement resonator according to claim 5, characterized in that
the through-opening is formed in one of the curved mirrors.

7. The optical enhancement resonator according to claim 6, characterized in that
on a first and a second of the mirrors phase masks are applied,
wherein the second mirror with phase mask is located at the position of an image of the first mirror with phase mask,
the first mirror with phase mask is the curved mirror with a slot-shaped through-opening,
a mode number difference of a decomposition in the transverse direction perpendicular to the plane of the beam path has the value $\Delta n = 4$,
and a mode combination of the Gauss-Hermite modes $GH_{1,0}$ and $GH_{5,0}$ is excited, which has four beam lobes at the position of the curved mirror with through-opening, each of which oscillates in antiphase and
is set in phase by means of the phase mask, so that at the beam waist between the two curved mirrors the intensity on the optical axis is a maximum.

8. The optical enhancement resonator according to claim 7, characterized in that
the ring resonator, in addition to the curved mirrors and the second mirror with phase mask, comprises at least three further mirrors.

9. The optical enhancement resonator according to claim 1, characterized in that
on a first and a second of the mirrors, phase masks are applied, wherein the second mirror with phase mask is located at the position of an image of the first mirror with phase mask.

10. The optical enhancement resonator according to claim 1, characterized in that
one or more collimators are arranged in the resonator, by means of which the field distribution in the resonator is influenced such that components of higher transverse eigenmodes of the resonator without an obstacle are suppressed.

* * * * *